H. M. HALL.
SHUTTER TRIP.
APPLICATION FILED JULY 5, 1917.

1,275,555.

Patented Aug. 13, 1918.

Inventor
Harold M. Hall
by Graham + Harris
Attorneys

UNITED STATES PATENT OFFICE.

HAROLD M. HALL, OF LOS ANGELES, CALIFORNIA.

SHUTTER-TRIP.

1,275,555.  Specification of Letters Patent.  Patented Aug. 13, 1918.

Application filed July 5, 1917. Serial No. 178,870.

*To all whom it may concern:*

Be it known that I, HAROLD M. HALL, a citizen of the United States, residing at Los Angeles, in the county of Los Angeles and State of California, have invented a new and useful Shutter-Trip, of which the following is a specification.

My invention relates to the art of photography, and more particularly to the cameras which are used in that art.

In the ordinary form of camera, a shutter is provided which is tripped for the purpose of making an exposure of the photographic plate. This shutter is ordinarily released or tripped by means of a shutter trip lever which may be operated by means of compressed air from a bulb, or which may be operated directly by the finger of the photographer. The operation of the shutter trip lever ordinarily requires that the photographer be immediately adjacent to the camera. There are a number of conditions under which it is desirable that the operator be at a distance from the camera, and there are also a number of conditions under which it is desirable that there be no operator at all.

The principal object of my invention is to provide a shutter trip by which the camera may be operated through a cord by an operator at a considerable distance from the camera, or by which the shutter may be tripped by the person, animal, or thing, which it is desired to photograph.

As the conditions under which a shutter trip is of utility are very numerous, and the positions of the camera with relation to the remote operator are varied, it is a further object of my invention to provide a shutter trip which may be operated through a cord which may leave the camera at a wide variety of angles with relation to the line of sight of the camera.

Referring to the drawings, which are for illustrative purposes only:

Figure 1:
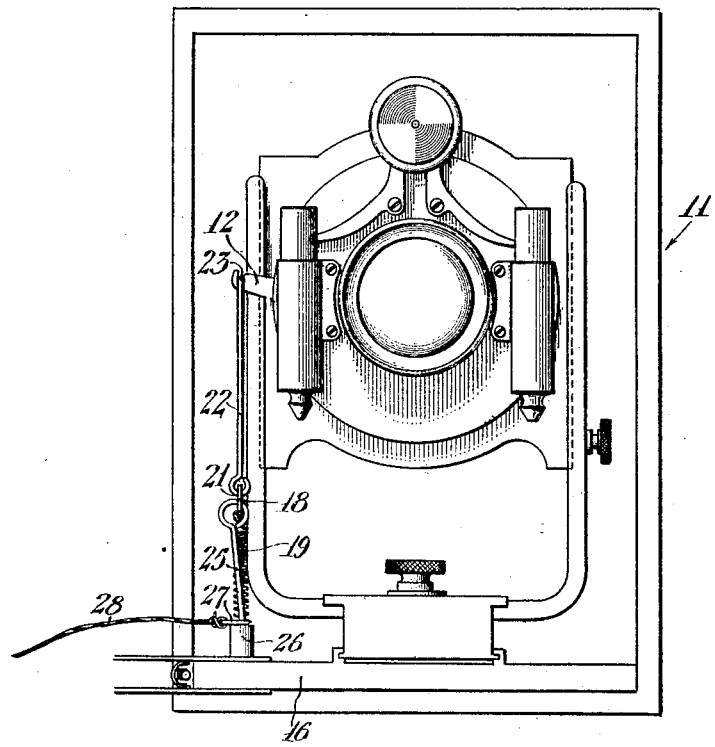
Figure 1 is a front view of a camera equipped with my invention.
Figure 2:
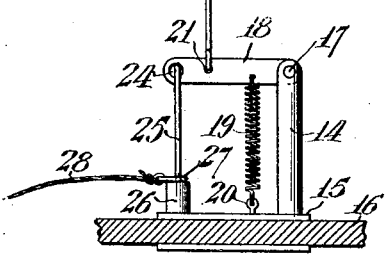
Fig. 2 is a side view of a portion of the camera shown in Fig. 1.

In the drawings, a camera 11 is provided with a shutter trip lever 12 which is pushed down upon whenever it is desired to make an exposure through the lens 13. For the purpose of accomplishing the above objects, I provide the shutter trip mechanism shown in the drawings, in which 14 is a standard secured to a base plate 15 secured by any convenient means to the base 16 of the camera 11. Pivoted on a pin 17, carried in the standard 14, is a trip lever 18 to which is attached a tension spring 19, this spring being attached at 20 to the base plate 15. Pivoted at 21 on the lever 18 is a link 22 which is hooked over, passing through a hole 23 in the shutter trip lever 12. Pivoted loosely at 24 on the extreme end of the lever 17 is a latch 25, this bar being freely movable in all directions and being of the proper length to rest on a latch block 26 secured to the base plate 15. A metal ring 27 is secured to a trip cord 28, this metal ring being placed over the latch 25 as shown in the drawings.

The method of operation of the invention is as follows:—

The camera being set for exposure, the parts are in the position shown in the drawings. When it is desired to make an exposure, a sharp pull on the cord 28 pulls the lower end of the latch 25 off of the latch block 26 and allows the spring 19 to actuate the shutter trip lever 12 through the link 22. The actuation of the shutter trip lever 12 makes the exposure and takes the picture.

The cord 28 may be used in a variety of ways. For example, the photographer may set up the camera directing and focusing it on a group of persons. He may then take his place in the group, and whenever he desires to take the picture a slight pull on the cord 28 will release the shutter lever 12 and make the exposure.

A further use of the camera is in animal photography, in which a bait may be used, this bait being attached to the end of the cord 28. The camera is then focused on the bait, and whenever the animal seizes the bait, and attempts to carry it away, the camera is tripped.

Many other practical applications of the invention will be evident to one skilled in the art of photography.

To be successful in these practical applications, it is necessary that the apparatus be small and compact and very certain in its operation.

It is further necessary that the apparatus allow the camera to be tripped with a very slight pull of the cord, and that after tripping the camera the cord may become detached without the loss of parts important to the tripping mechanism.

It will readily be seen that my invention is simple in its construction, consisting of a few pieces and they all of very low cost.

It will further be seen that the latch 25 will readily slide from the latch block 26, so that a very small pull on the cord will allow the spring 19 to act.

It will further be evident that the spring 19 may be made sufficiently strong to give a positive actuation of the camera. It will further be evident that as soon as the latch bar 25 leaves the latch block 26 that the ring 27 becomes disengaged from the latch bar 25 and the cord 28 may be entirely carried away without disturbing the camera. By so arranging the parts there is no danger of moving the camera even where a very heavy tug is given to the cord 28.

I claim as my invention:—

1. A shutter trip comprising a trip lever; means for connecting said trip lever to the shutter trip lever of the camera; a spring for actuating said trip lever; a latch universally pivoted at one end to said trip lever; a member against which the lower end of said latch may rest thus holding the spring in a tensed condition; and a cord detachably secured to said latch.

2. In a shutter trip a latch universally pivoted at one end and having its other end free to slide on a smooth surface and a cord encircling said latch in such a manner that it can pull free whenever said latch is tripped.

3. In a shutter trip, a tripping mechanism; spring means for actuating said mechanism; and a latch for holding said mechanism in a position to operate; said latch being so formed that it may be tripped by a string which thereafter pulls free from the latch.

In testimony whereof, I have hereunto set my hand at Los Angeles, California, this 28th day of June, 1917.

HAROLD M. HALL.

Copies of this patent may be obtained for five cents each, by addressing the "Commissioner of Patents, Washington, D. C."